United States Patent Office 3,798,306
Patented Mar. 19, 1974

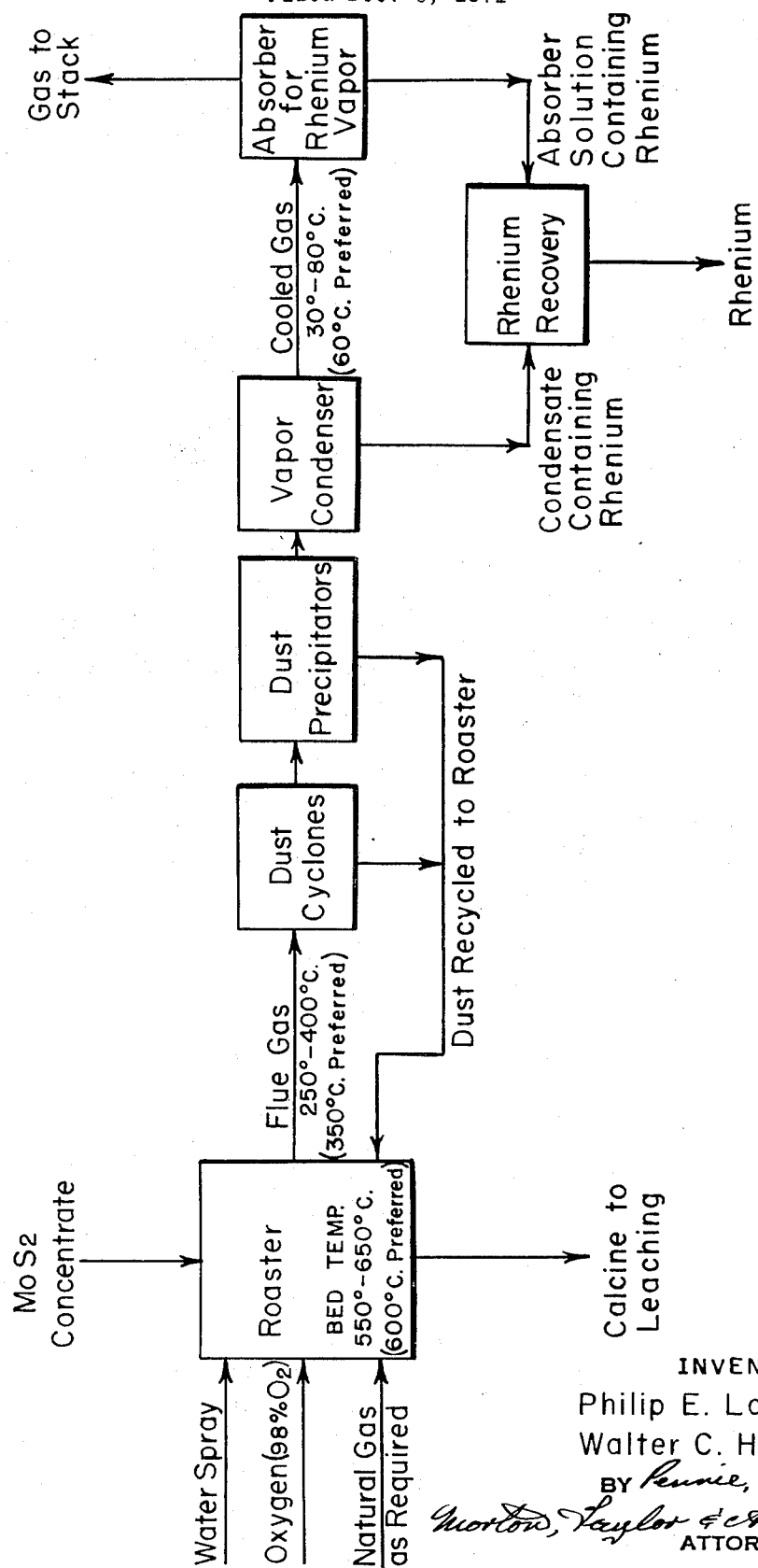

3,798,306
RECOVERY OF RHENIUM FROM MOLYBDENITE
Philip E. Lapat, New Haven, and Walter C. Hellyer, Danbury, Conn., assignors to Newmont Exploration Limited, Danbury, Conn.
Filed Dec. 6, 1971, Ser. No. 205,058
Int. Cl. C10g 47/00, 39/00
U.S. Cl. 423—50                                 6 Claims

ABSTRACT OF THE DISCLOSURE

The conventional oxidative roasting of molybdenite concentrate to molybdenum trioxide with separation of a gaseous effluent containing the indigenous rhenium content of the molybdenite is modified to reduce the dilution of the oxidized rhenium vapor species in the gaseous effluent by substituting a mixture of oxygen and water for air in the roasting reaction, the water serving to prevent excessive temperature generation during roasting so as to maintain the roasting zone temperature at about 600° C. The resulting gaseous effluent is then cooled to condense much of its water vapor content.

---

This invention relates to the oxidative roasting of molybdenite concentrates and, more particularly, to control of the roasting environment to obtain a gaseous roaster effluent of higher volume concentration of the rhenium indigenous to the molybdenite.

The conventional molybdenite roasting process consists of multiple-hearth roasting of the molybdenite concentrates with air, during which any rhenium indigenous to the molybdenite is largely volatilized as rhenium heptoxide ($Re_2O_7$) and perrhenic acid ($HReO_4$) and appears in the roaster gases. The rhenium-bearing vapor is absorbed from the roaster flue gas by cooling the gases and by scrubbing the cooled gases with an aqueous medium. The resulting rhenium-bearing aqueous solution is then appropriately concentrated. The rhenium content is separated from the resulting scrubber solution by ion exchange or solvent extraction and is crystallized therefrom as a pure rhenium compound such as ammonium perrhenate. The calcine from the roasting operation contains copper as an impurity, and after removal of the copper by conventional hydrometallurgical technique, the calcine comprises technical grade $MoO_3$.

The above-described roasting method possesses several advantages which have been responsible for its retention as the preferred commercial method of molybdenite treatment long after the multiple-hearth furnace was displaced from other sulfide-roasting applications by fluid bed roasting or other pyrometallurgical techniques. The advantages include:

(1) Roasting provides a straightforward and effective means for eliminating sulfur and of separating rhenium by volatilization.

(2) The main molybdenum circuit is short and simple.

(3) The principal molbdenum product is commercially desirable technical grade oxide, rather than the high purity oxide for which only a limited market exists.

(4) Multiple-hearth roasting of molybdenite concentrates has a long record of successful industrial-scale experience. It provides the slow oxidation conditions peculiarly suited to molybdenite which require a narrow operating temperature span because of sintering, slagging and volatilization tendencies of the sulfide and oxide.

(5) Reagent costs are low because the tonnage consumables are limited to air, water, sulfuric acid and natural gas. The more expensive reagents, such as the solvent extraction operation requires, are consumed in modest or negligible quantities.

Although there are some inherent disadvantages in this air-roasting process for molybdenite concentrates, none is important by comparison with the failures experienced heretofore in attempting to collect rhenium from the roaster flue gas. The inadequacy of rhenium recovery in the air-roasting process results primarily from two facts: (1) a great excess of air is passed across the roaster hearths to remove the large heat of reaction between the molybdenum sulfide and oxygen, which is minus 264.4 kcal./g.-mol of $MoS_2$, with the result that the concentration of rhenium vapor species in the flue gas is thereby diluted to a few parts per million; and (2) the condensed aqueous species of rhenium heptoxide (perrhenic acid) is quite volatile at room temperature. Therefore, absorption of the perrhenic acid vapor by water is difficult because its partial pressure is not greatly different from the equilibrium vapor pressure over absorber solutions.

It has been found that the volume of flue gas produced by the roasting of molybdenite can be decreased by substituting water-spray cooling on the hearths in lieu of excess cooling air. The resulting volume of flue gas at the furnace exit is about ⅓ of that produced in conventional roasting. When the flue gas is passed through conventional dust removal equipment and then through a condenser in which its temperature is reduced to about 60° C., its volume is further reduced by elimination of much of its water vapor content to about ⅕ the volume of that produced in conventional molybdenite roasting.

It has been found further that the volume of flue gas can be decreased by the substitution of oxygen for air. In itself, this simple substitution has no merit and is impractical because the rate of roasting increases with the oxygen partial pressure, while at the same time the flow of gas available to carry away the increased reaction heat becomes smaller. As a result, the temperature of the calcine cannot be maintained within acceptable limits. However, by combining the concept of water-spray cooling on the hearth with the substitution of oxygen for air, we have discovered that it is possible (a) to maintain effective cooling of the roasting concentrate, and (b) to obtain suitably low oxygen partial pressures without dilution of the flue gas by nitrogen formerly resulting from the use of air as the roasting medium. In effect, the role of nitrogen is completely assumed by a smaller quantity of condensable water vapor, and the overall result is a very large decrease in the volume of flue gas produced after it has passed through a condenser and thus cooled to a temperature of about 20° to 80° C., and preferably to about 60° C.

The present invention is, therefore, an improvement in the process of progressive oxidative roasting of molybdenite concentrate in a plurality of stages to convert the molybdenum sulfide thereof to a recoverable commercial grade molybdenum trioxide and to obtain a gaseous effluent containing in oxide vapor form rhenium indigenous to the molybdenite concentrate, and thereafter passing the resulting gaseous effluent into contact with a liquid solvent to obtain its rhenium oxide content in recoverable form in the solvent. This improvement comprises increasing the rhenium concentration in the gaseous effluent (a) by roasting the concentrate with commercial grade oxygen in amount at least 40% of that stoichiometrically equivalent to the molybdenum sulfide content of the concentrate when ultimately converted to molybdenum trioxide and sulfur dioxide, and (b) by introducing water into at least the initial concentrate roasting stage in amount sufficient to effect significant cooling largely by its evaporation and to dilute with water vapor the oxygen partial pressure in the roasting operation, said cooling and dilution being such as to maintain a non-sintering apparent roasting temperature within the range of about 550°–650° C. Thereafter, the resulting solid calcine is discharged and is recovered as commercial grade molybdenum trioxide and the resulting relatively high rhenium content gaseous effluent from the roasting zone is cooled to remove a major portion of its water vapor content by condensation.

At first impression it may seem as if the oxygen partial pressure is not truly an independent variable in our process because the ratio of water spray to oxygen is presumably fixed by the heat-removal requirement. Although operation under this condition appears to be optimum, it is clearly possible to make the oxygen partial pressure independent, and still satisfy the heat removal requirement, by using a mixture of water spray, extraneous steam and oxygen or a mixture of water spray, oxygen and air in which latter case at least a portion, but less than 60%, of the oxygen required for the roasting can be supplied by the air. Regardless of which technique is selected, the oxygen plus water spray feature of our process inherently possesses the ability to utilize oxygen substitution for air without increasing the absolute value of oxygen concentration in the furnace atmosphere. In all events, the oxygen used in the practice of the invention is that of commercial grade containing about 95 to 99.9 volume percent $O_2$.

Control of the roasting rate and temperature of the reacting particles is essentially important in molybdenite roasting. Reaction rate is controlled by the partial pressure of the oxygen in the various stages of the roasting operation, higher oxygen partial pressure being required in the latter stage because of depletion of the sulfur content of the roasting charge. Thus, we have found it advantageous to maintain the partial pressure of the oxygen in the initial stage of the roasting operation at a value within the range of about 2 to 40 volume percent of the roasting atmosphere and in the latter stage of the roasting operation at a value within the range of about 10 to 80 volume percent of the roasting atmosphere. The partial pressure of the oxygen in these stages is controlled in the practice of our process by the rate of addition of water which forms water vapor in the roasting atmosphere, but the rate of addition of the water, which is a coolant for the reaction, also effects temperature control in the reaction stages. For reasons previously stated, the apparent bed temperature should be maintained near 600° C., although it can vary about ±50° C. from the preferred value provided that the actual temperature prevailing in the particles does not cause sintering to take place. In the case of a multiple-hearth roaster, for example, temperature control is achieved by varying the flow of spray water to the upper hearths as required by temperature indications on or immediately above each hearth, and therefore the measured temperature is the "apparent" temperature of the bed as measured by conventional optical or other pyrometric technique and is not necessarily the actual temperature of the roasting particles. In the lower hearths, where heat may have to be added rather than removed because of depletion of the sulfur content of the particles being roasted, the addition of a fuel such as natural gas, oil or coal may similarly be made and varied in response to the temperature sensors in order to maintain the reaction particles near the desired temperature.

Although the reaction rate and temperature control have been described in connection with a multiple hearth furnace, it must be understood that the same controls can be achieved when practicing our process in a rotary kiln or a rabbled single-hearth furnace, or by a combination of either with one another or in combination with a multiple-hearth furnace. In the case of a rotary kiln, the initial stage of the roasting operation exists in that portion of the vessel near the end to which the molybdenite is charged and the latter stage of the roasting operation exists toward the end of the vessel from which the molybdenum trioxide calcine is discharged. In a single-hearth furnace, the arcuate portion of the hearth traversed by the rabble beginning at the point of charge of the molybdenite comprises the initial stage of the roasting operation, and the latter stage of this operation exists in the arcuate region near the point of discharge of the calcine from the hearth.

In the following specific example of operation of our process, the flow of materials and products is as shown in the accompanying Flow Sheet, the natural gas being supplied to the lower hearths of a multiple-hearth furnace in amount sufficient to maintain the charge being roasted thereon at a temperature of about 600° C. The $MoS_2$ is supplied as a high grade molybdenite concentrate containing about 93% $MoS_2$ and about 0.05% Re, both by weight. The amounts of charged materials, by-products and final products are given in the following table in which the data in Column A are for conventional air-roasting of the molybdenite concentrate and the data in Column B are for the process of the invention illustrated in the Flow Sheet:

|  | A | B |
|---|---|---|
| Consumed: |  |  |
| $MoS_2$ concentrate, lbs. Mo./day | 10,000 | 10,000 |
| Natural gas, s.c.f.m. | 37 | 7.4 |
| Air, s.c.f.m. | 5,405 |  |
| Commercial grade oxygen, 98% $O_2$ by volume, s.c.f.m. |  | 134.2 |
| Spray water, g.p.m. |  | 3.10 |
| Produced: |  |  |
| Heat, million B.t.u./hr. | 4.38 | 2.65 |
| Flue gas at roaster exit, s.c.f.m. | 5,406 | 618 |
| Flue gas at roaster exit, composition (volume percent): |  |  |
| $SO_2$ | 1.0 | 8.5 |
| $CO_2$ | 0.8 | 1.7 |
| $H_2O$ | 4.8 | 86.4 |
| $N_2$ | 76.4 | 0.4 |
| $O_2$ | 17.0 | 3.0 |
| Flue gas after cooling at 60° C., s.c.f.m. (partial water removal by condensation) | 5,406 | 108 |
| Rhenium concentration in cooled gas to absorbers, p.p.m. by volume | 2.05 | 99.8 |

We claim:

1. In the process of progressive oxidative roasting of a rhenium-containing molybdenite concentrate in a plurality of stages to convert the molybdenum sulfide thereof to recoverable commercial grade solid molybdenum trioxide and to obtain a gaseous effluent containing rhenium primarily in the form of perrhenic acid vapor, and passing the resulting gaseous effluent into contact with a liquid solvent to obtain its perrhenic acid content in recoverable form in the solvent, the improvement which comprises increasing the rhenium concentration in the gaseous effluent (a) by roasting the concentrate with commercial grade oxygen in amount at least 40% of that stoichiometrically equivalent to the molybdenum sulfide content of the concentrate when ultimately converted to molybdenum trioxide and sulfur dioxide and (b) by continuously introducing liquid water into at least the initial concentrate roasting stage in amount sufficient to effect significant cooling largely by its evaporation and to dilute with water vapor the oxygen partial pressure in the roasting operation, said cooling and dilution being such as to maintain in the presence of said added oxygen a non-sintering apparent roasting temperature within the range of about 550–650° C., thereafter discharging and recovering the resulting solid commercial grade molybdenum trioxide calcine, and cooling the resulting relatively high rhenium content gaseous effluent from the roasting zone to remove a major portion of its water vapor content by condensation.

2. The process according to claim 1 in which the oxygen partial pressure in an initial stage of the roasting operation is maintained at a value within the range of about 2 to 40 volume percent of the roasting atmosphere and in a latter stage of the roasting operation is maintained at a value within the range of about 10 to 80 volume percent of the roasting atmosphere.

3. The process according to claim 1 in which the oxygen partial pressure in the roasting zone is controlled in part by the addition of extraneous steam.

4. The process according to claim 1 in which the oxygen partial pressure in the roasting zone is controlled in part by the addition of air.

5. The process according to claim 1 in which the temperature of the gaseous effluent from the roasting operation is maintained within the range of about 250° to 400° C.

6. The process according to claim 1 in which the gaseous effluent from the roasting zone is cooled to a temperature within the range of about 20° to 80° C. prior to extraction of its rhenium content.

References Cited

UNITED STATES PATENTS

| | | | |
|---|---|---|---|
| 3,348,942 | 10/1967 | Davenport | 423—49 |
| 3,376,104 | 4/1968 | Messner et al. | 423—55 X |
| 1,118,150 | 11/1914 | Robertson | 423—606 X |

HERBERT T. CARTER, Primary Examiner

U.S. Cl. X.R.

423—49, 53, 55

UNITED STATES PATENT OFFICE
CERTIFICATE OF CORRECTION

Patent No. 3,798,306      Dated March 19, 1974

Inventor(s) Philip E. Lapat and Walter C. Hellyer

It is certified that error appears in the above-identified patent and that said Letters Patent are hereby corrected as shown below:

Column 1, line 18, "during roasting so" should read --during roasting reaction so--;
           line 57, "molbdenum" should read --molybdenum--.
Column 2, line 8, "264.4 kcal./g.-mol" should read --264.4 k-cal/g-mol--;
           line 53, "in oxide vapor" should read --in oxidic vapor--.
Column 4, line 21, "lbs." should read --lb.--;
           line 34, "colume" should read --vol.--.

Signed and sealed this 30th day of July 1974.

(SEAL)
Attest:

McCOY M. GIBSON, JR.
Attesting Officer

C. MARSHALL DANN
Commissioner of Patents